United States Patent [19]

Parker et al.

[11] Patent Number: 5,247,796
[45] Date of Patent: Sep. 28, 1993

[54] SOLAR AUGMENTED POWER SYSTEM

[76] Inventors: Robin Z. Parker, 10965 SW. 95th St., Miami, Fla. 33176; Robert J. Hanrahan, 3730 16th Pl.; John D. Cox, 3416 SE. 29th Blvd., both of Gainesville, Fla. 32601

[21] Appl. No.: 852,520

[22] Filed: Mar. 17, 1992

Related U.S. Application Data

[63] Continuation-in-part of Ser. No. 814,031, Dec. 27, 1985, Pat. No. 4,848,087.

[51] Int. Cl.⁵ .............................. F01K 25/06
[52] U.S. Cl. .................. 60/673; 60/641.15; 60/649
[58] Field of Search .......... 60/641.8, 644.15, 649, 60/673, 651, 671, 655; 126/900; 165/104.12

[56] References Cited

U.S. PATENT DOCUMENTS

| | | | |
|---|---|---|---|
| 2,969,637 | 1/1961 | Rowekamp | 60/641.8 |
| 4,068,474 | 1/1978 | Dimitroff | 60/641.15 |
| 4,084,577 | 4/1978 | Rhodes | 126/443 |
| 4,158,354 | 6/1979 | Carden | 165/104.12 X |
| 4,376,372 | 3/1983 | English, Jr. | 60/641.8 X |
| 4,799,357 | 1/1989 | Hanrahan et al. | 60/673 |
| 4,829,768 | 5/1989 | Carden | 60/673 |
| 4,848,087 | 7/1989 | Parker et al. | 60/641.15 |

Primary Examiner—Stephen F. Husar
Attorney, Agent, or Firm—Cushman Darby & Cushman

[57] ABSTRACT

The present invention relates to an energy conversion system and more particularly tot he related apparatus and process. A reactor chamber is positioned with respect to a means for collecting and focussing. The focussed beam of radiation is employed to induce a reversible reaction in which the reaction products are converted into work in a work output means. Following that conversion, the reaction materials are passed through a heat sink and are recycled so that the process can be continuously operated.

6 Claims, 5 Drawing Sheets

DIHALOGEN ABSORPTION SPECTRA AT 25°C

Fig. 7.

INTERHALOGEN ABSORPTION SPECTRA AT 25°C

Fig. 8.

SOLAR RADIATION (VACUUM)

SOLAR AUGMENTED POWER SYSTEM

This application is a continuation in part of U.S. Ser. No. 814,031 filed Dec. 27, 1985, now U.S. Pat. No. 4,848.087.

TECHNICAL FIELD

The present invention relates to a solar augmented power system, and more particularly to a power system and method for generating power utilizing controlled, solar augmented halogen disassociation reactions.

BACKGROUND ART

In the past, techniques for converting electromagnetic energy, such as, solar energy, to electrical or to mechanical energy usually involved a flat plate collectors wherein fluids or gases were circulated to carry away the heat energy thus received. These solar collectors absorbed energy only in the near and far infrared spectrum leaving much of the visible spectrum unavailable for heat production. Moreover, these systems generally did not use the generated heat for driving electromechanical devices, such as, turbines and generators.

Rhodes discloses, in U.S. Pat. No. 4,084,577, a solar converting apparatus wherein halogens such as iodine or bromine are introduced into a sealed enclosure and irradiated with solar energy. The solar energy is converted to heat and utilized to heat a fluid passing through a pipe. There is no teaching of how such converted energy could be directly used to drive an electro-mechanical device such as a turbine or generator.

In U.S. Pat. No. 2,969,637, Rowekamp discloses a system for converting solar energy into mechanical energy. A volatile liquid such as dichloro-difluoro-methane is heated by means of exposure to sun rays with the resulting expansion of gases passing through a turbine having a shaft connected to the armature of an electrical generator. A disadvantage of this system is that dichloro-difluoro-methane has very limited absorption in the visible region, this material could not be used to absorb solar energy directly. The prior art process basically consists in a system of piping which is exposed to the sun. The piping heats the volatile liquid contained therein by conduction.

U.S. Pat. No. 4,376,372, to English, also discloses a solar collector in which pipes containing liquid are heated to collect solar energy. U.S. Pat. No. 4,068,474to Dimitroff, discloses an apparatus based on similar principles in which solar radiation is focused on the head of a conductor which, in turn, heats water to produce steam. Yet another such process is disclosed in U.S. Pat. No. 4,158,354, in which the heat exchanging fluid is ammonia.

Still further efforts to derive power from solar energy are disclosed in U.S. Pat. Nos. 3,998,205, 4,024,715, 4,026,112, 4,175,381 and 4,426,354. Such additional efforts have certain drawbacks. For instance, fuel and oxidants are required for generating power from solar radiation. Also, additional processing steps are oftentimes required.

DISCLOSURE OF THE INVENTION

The present invention related to an energy conversion system and more particularly to the related apparatus and process. The system includes a reactor chamber having an input for a diatomic reactant such as halogen, or interhalogen supplied from a supply vessel, and means for receiving and transmitting a focused beam of electromagnetic or other radiation into the reactor itself. The reactor chamber is positioned with respect to means for collecting and focusing radiation, such as electromagnetic radiation, such that a beam of focused radiation passes through the receiving and transmitting means provided in the wall of the reactor.

The focused beam of radiation is, therefore, employed to induce a reactive substance to react to produce monatomic reaction products at high temperatures and elevated pressures. Advantageously, the reaction is reversible. The heated, pressurized materials thus obtained in the reactor chamber are controllably exhausted through the output means and introduced into means for converting the heat and pressure of the pressurized materials into other useful work. Following that conversion, the materials are passed through to a heat sink. The reaction materials re-associate to the original reactants and thereafter are stored for recycling. The process can be continuously operated.

The present invention provides means for augmenting power systems without the need for the conjoint presence of an oxidant and fuel.

The present invention provides means for avoiding additional process steps required to treat and dispose of oxidation-by-products.

BEST MODE FOR CARRYING OUT THE INVENTION

The present invention will now be described in terms of the currently perceived preferred embodiments.

Electromagnetic radiation is concentrated and intensified by a parabolic reflector system. The parabolic reflector concentrates the radiation into a focal point reflector. The focal point reflector reflects the focused intense radiation beam through a window which is encased in the reactor wall or near an end of thereof. In the preferred mode of realizing this embodiment, the window is encased in one end of the reactor such that the intense focused radiation beam passes through the window and travels lengthwise through the reactor in the direction of the other end of the reactor. A reactive material undergoes, preferably, a reversible, gas phase disassociation as the foccused radiation beam is directed into the reactor into which the reactive material has been introduced. If the reactive materials are halogens, interhalogens, or mixtures thereof, the monatomic reaction products reassociate almost immediately to form molecular reaction products of higher rotational and vibrational energy. The reaction products, now at elevated temperature and pressure, are removed from the reactor and introduced into an energy converter, such as a turbine assembly. The energy converter should be protected against the corrosive attack of the reaction products. The pressurized and heated reaction products generated in the reactor drive the energy converter. As the heat and pressure are extracted, the exhaust products from the energy converter are passed through a heat exchange - heat sink assembly. The heat extracted from the assembly may be radiated as waste energy, stored for other uses, or used in an ammonia cycle for air conditioning. The exhaust products then exit from the heat exchange heat sink assembly. The reactive products reassociate and are re-introduced into a storage/supply vessel.- Controllably interruptable supply lines run from the storage/supply vessel to the reactor. As is evident, the process may be continuously run.

More particularly, the reflector system includes additional advantageous features. In the case wherein the electromagnetic radiation source is the sun, the parabolic reflector system tracks the sun by means of an azimuth tracking system. The azimuth tracking system governs the operation and direction of the reflector. The reflector may have a flat or convex shape. While preferably the concentrator is a parabolic reflector, a Fresnel lens or Fresnel mirror may be used. Further, rough-shaped mirror and/or reflector arrays may be used and a reactor may, if desired, be provided with a window along a side thereof instead of at the end to take advantage of the radiation flux focused by the reflector array.

A solar reflector system can capture and generate about 1 kilowatt per square meter of reflector surface exposed to the electromagnetic radiation source.

The reactor itself is advantageously designed to provide for internal circulation of the reaction products and reactants. The reactor is preferably, cylindrically shaped. A window is preferably encased in one end. The exhaust port is advantageously located at or proximal to the other end. The entry port for the reactive material can be located proximal to the reactor end having the encased window. The focused radiation beam enters the reactor through the window and initiates the reaction in the region closest to the window. The reaction progresses in a reaction zone extending away from the window toward the exhaust port. In this embodiment, the zone is hottest nearer the exhaust port and cooler rear the entrance of the chamber. Consequently, currents are generated within the reactor such that, for instance, the reaction products migrate through the reaction zone toward the exhaust port. Cooler material circulated along the reactor walls back toward the entrance. This embodiment continuously provides a cooling effect because cool material (gas/liquid) from the supply vessel is introduced to that portion of the reaction zone which is closest to the sight window. Still further, reactive material is supplied to that section of the reaction zone wherein the reaction is being initiated.

More specifically, the reaction zone and reaction products will have additional advantageous characteristics. In the case where the reaction products are atomic halogens, the reaction zone will have a temperature gradient The temperature nearest the sight glass will be on order of 410° K. to 600° K. and will increase to about 1400° K. near the end of the reaction. The halogen reaction products will thus be under high pressure and temperature. The enhanced pressure and temperature implies that there is a greater amount of potential convertible energy in the system. Still further, the reactant substance surprisingly exhibits very useful radiation absorption characteristics such that almost the complete spectrum of the electromagnetic radiation from a solar radiation source is useful in the photolysis reaction(s) in the reactor in the solar embodiment.

In a preferred embodiment of the present invention, the reactor chamber may comprise a plurality of transparent chambers each containing a different reactant. The advantage of such an embodiment is that a different portion of the solar spectrum may be absorbed by each reactant. By combining a plurality of reaction chambers containing different reactants the percentage of the solar spectrum utilized may be maximized.

The heat exchange/heat sink assembly is more appropriately characterized as a heat sink. The heat exchange/heat sink must be capable of withstanding high temperatures. A suitable heat exchange/heat sink is a silicon carbide heat exchanger. More particularly, an exemplary heat exchange/heat sink may comprise, for instance, a carbonaceous boiler which includes a block of impervious, low permeability silicon carbide capable of operating at temperatures in excess of 2000° F. A suitable device is disclosed in U.S. Pat. No. 4,055,165, The fluid introduced into the reactor is a reactive substance capable of undergoing a reversible disassociation reaction under the process conditions of the present invention such that upon exothermic recombination minimal or no side-product formation occurs. The fluid is preferably a reactive gas. The reactive gas is preferably energy absorbing. Exemplary suitable reactive substances include halogens such as, bromine, iodine, chlorine or interhalogens such as iodine monochloride or bromine chloride.

The diatomic halogens $Cl_2$, $Br_2$, and $I_2$ have relatively broad absorptions peaking at about 330, 410 and 490 nm. The quantum yield for production of atoms from these molecules is essentially unity from 250 nm to 500 nm. Those molecules, when reacted, convert from about 17% to approximately 30%, at 300° K., of the solar radiant energy into the heat of formation of ground state or excited atoms. When diatomic interhalogens are considered, the absorption range is extended beyond 600 nm, and the solar absorption efficiency is above 35%, at 300° K.

When absorbed photon energy exceeds the heat of formation difference between product and parent, photo-disassociation occurs with the excess energy going to internal translational energy of the photolytic fragments. Consider the photochemical dissociation of chlorine induced by absorption in the 250 to 450 nm band. The peak of absorption at 330 nm corresponds to 86.6 kcal/mole (see item (1) below). Since two Cl ($^2P_{3/2}$) atoms are formed, having a heat of formation of 2×28.9 kcal/mole or 57.8 kcal/mole, there are 28.8 kcal of extra photo-deposited energy per mole of chlorine dissociated. Alternatively, the dissociation process may form $^2P^*$ and $$Cl_2 + h\nu > 2Cl^* \ldots +86.6 \text{ kcal/mole,} \qquad (1)$$

Radiation Augmentation of $Cl_2$ at 330 nm.

Terrestrial 330 nm radiation is scant, and the description herein will address radiation deposition (<500 nm), forming atomic chlorine, item (2).

$$Cl_2 + h\nu > 2Cl \ldots +57.8 \text{ kcal/mole,} \qquad (2)$$

Photolytic Dissociation of $Cl_2$ at 500 nm.

There are essentially two ways of recovering the augmented energy deposited. One is by the exothermic reaction generated by the recombination of the photolytic fragments back into the parent molecules, item (3), $$2Cl > Cl_2 \ldots -57.8 \text{ kcal/mole,} \quad (3)$$

Recombination of $Cl_2$ or the second energy recovery method, item (4), is to combine the parents with an additional reactant to yield a new product.

$$2Cl + H_2 > 2HCl \ldots -101.8 \text{ kcal/mole,} \quad (4)$$

New Product Formation.

Diatomic chlorine has a relatively broad absorption spectrum, peaking at 330 nm. While this peak is in the UV range, at 1500° K., the absorption an broaden and will absorb 30% of the solar spectrum, or complete absorption of available solar radiation below 500 nm. Preheating chlorine by depositing the longer wavelength photons in a solid body accesses molecular vibration systems so that more of the radiation <500 nm will be used thereby assessing atomic electronic systems.

If the reactive fluid is essentially transparent to the radiation flux, then an additional component must be introduced into the reactor to receive and absorb the energy from the radiation flux, and to then transmit to the energy to an absorbing reactive fluid. The energy absorbers/radiators include suitable diluent materials and suitable structural apparatus members or inserted elements. In embodiments of the latter type, the reactive fluid is introduced into the reactor packed with opaque spheres and transparent spheres. The latter packing arrangement provides physical distribution of the energy absorption and radiating opaque spheres. The flowing reaction fluid, gas or liquid, absorbs the energy of the radiation flux radiated from the packed spheres.

All of the radiant energy deposited into the gases will be released in a manner that is governed by the system kinetics and thermochemistry. All energy that is not re-radiated should eventually appear as sensible heat of product gases at a composition and temperature governed by thermo-chemical equilibrium. This sensible heat is thus available to do work or be transferred to another medium. To the extent that absorbed radiation is used to break bonds, it resides in the positive heat of formation of radicals such as Cl atoms. This energy is only available as product heat upon return of the system to its original chemical state or to a state of equivalent or lower heat of formation. This results in a compromise or tradeoff between high gas temperatures, which lead to efficient heat transfer and low gas temperatures, in which atom recombination is maximized and heat energy content is higher.

In the present invention, the augmented energy deposited in the reactive material is recovered following the exothermic reaction generated by the recombination of the fragments (photolytic fragments in the solar embodiments) back into the parent molecules.

The radiation flux has been described previous as electromagnetic radiation. Preferably, solar rays are the source of that radiation. However, it should be readily apparent to those skilled in the art that other sources of particle and electromagnetic radiation energy are suitable.

Exemplary alternative sources include photons generated from nuclear excited flash lamps, alpha particles, beta particles, gamma rays, x-rays, proton, or fission fragments. In the event an alternative radiation flux source is employed, then the window will, of course, be selected to transmit optimally the radiation being used. In the case of solar radiation, the window must be optically transparent. In any event, the window must be transparent to the radiation flux used and must be physically strong enough to withstand the process conditions.

The choice of the energy convertor is dictated by the energy deposition into the working fluid. Exemplary energy converter include the previously mentioned turbine system and also piston or MHD systems.

The present invention will now be described with reference to FIGS. 1, 2, 3 and 4.

Figure 1:
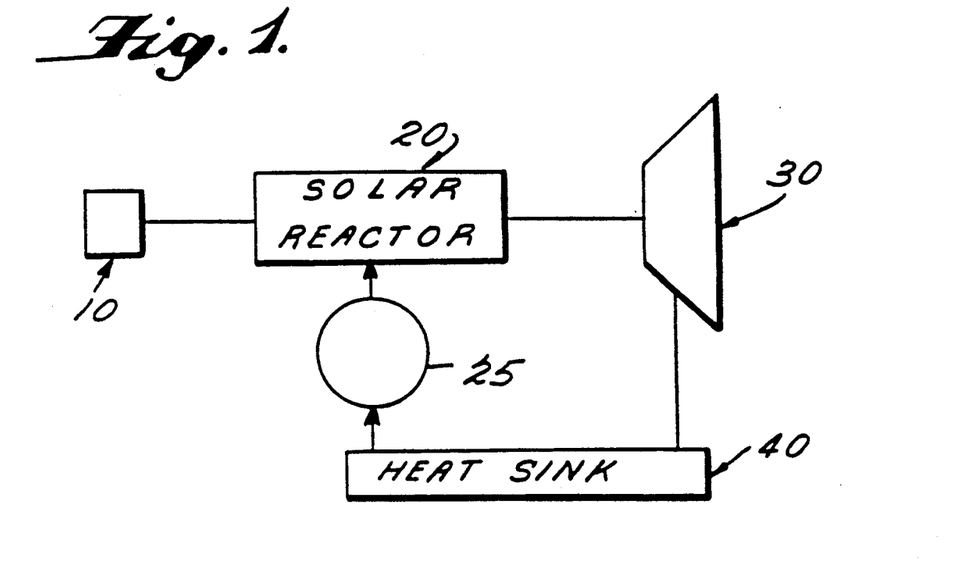
FIG. 1 illustrates, in schematic form the components of the prepared embodiment of the present invention.

FIG. 1 illustrates, in block diagram form the preferred embodiment of the present invention. Radiation source and focusing means 10 generates and/or focuses a radiation beam which is introduced into reactor 20. A reactive material, such as a halogen (e.g. chlorine) or interhalogen, is introduced into reactor 20 from supply vessel 25. The radiation beam introduced into reactor 20 initiates a reaction which, in the case of halogens such as chlorine, generates monatomic reaction products. The reversible reaction results in increased pressure and temperatures being rapidly attained within reactor 20. The pressurized and heated reaction products are exhausted from reactor 20 and introduced into an energy converter 30. Energy converter 30 converts the energy retained in the hot pressurized reaction products into useful work or, for instance, converts heat/pressure into energy by, for instance, generating electricity. After the reaction products complete the cycle through the energy converter, such products are introduced into and pass through heat exchanger/heat sink 40. Heat exchanger/heat sink 40 absorbs heat from the reaction products and thus cools the products. The cooled products are returned to the supply vessel 25. As the reaction products are introduced in and pass through the system before being recycled to the supply vessel, because of the reactions involved, the starting materials are re-generated. The apparatus described is thus suitable for use in practicing the process on a continuous basis.

Figure 2:
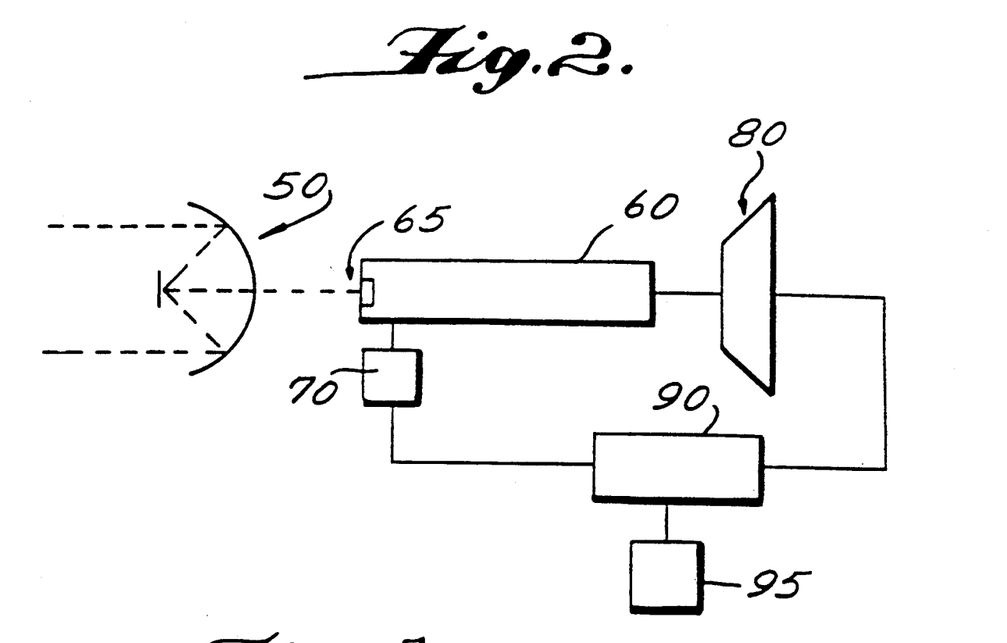
FIG. 2 illustrates a preferred embodiment of the present invention.

FIG. 2 illustrates a preferred embodiment of the present invention. The reflector means 50 for capturing and for focusing solar rays produces a narrow intense focused solar beam. The reflector means may also include the previously described azimuth tracking means. The reflector means illustrated in FIG. 2 is a Cassegrain optical system. Other suitable exemplary reflector means include a Fresnel lens or a Fresnel mirror. The solar beam is introduced through a solar optical window 65 located at a first end of cylindrically shaped solar furnace 60. The solar furnace 60 includes means for being charged with material which react to disassociate preferably reversibly. The materials are contained within reactant supply container 70. The second end of solar reactor has means for exhausting the reaction products produced by the reactions induced by the direct (or indirect) solar beam. The thus exhausted products are used to drive an energy converter 80, such as a turbine. The products exiting the energy converter 80 are cooled in a heat sink/heat exchanger 90. Heat sink/heat exchanger 90 may, for example, use the heat retained by the products or regenerated starting material, to heat water for other subsequent use. The products reassociate, i.e., regenerate, to form the starting materials. The cooled and regenerated starting materials are returned to reactant supply container 70 for re-use. An ammonia cycle 95, as is known in the art, may also be provided in combination with the heat sink/heat exchanger 90.

Figure 3:
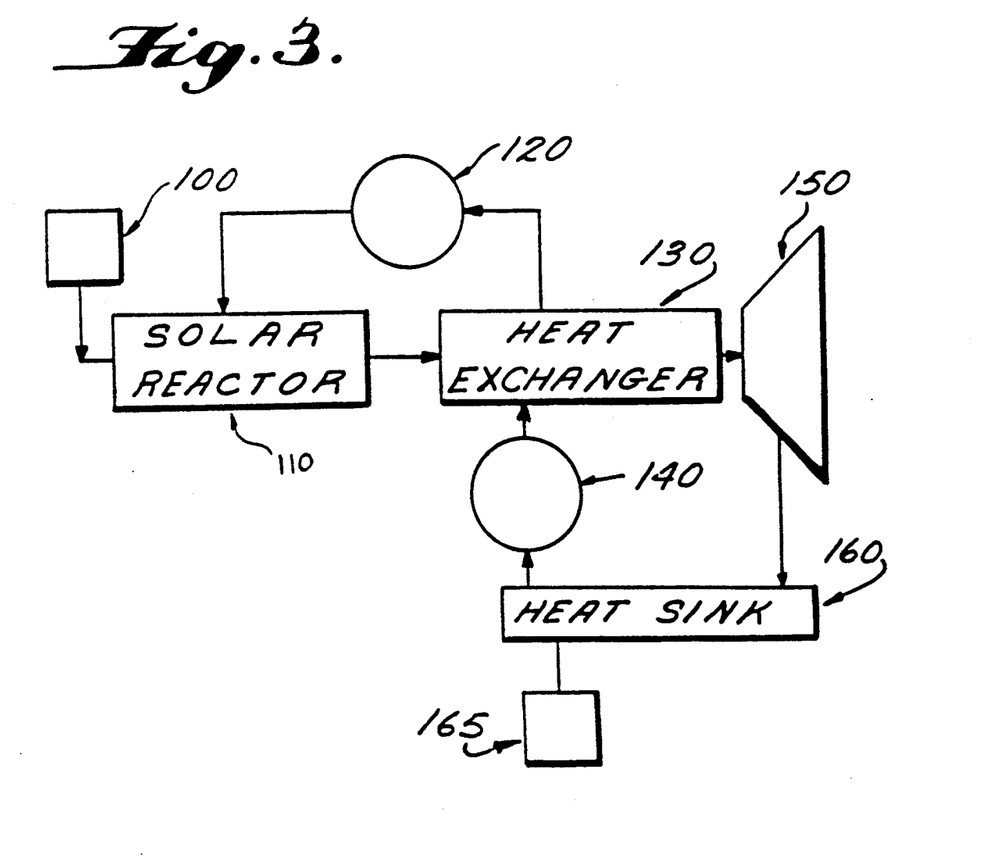
FIG. 3 illustrates another preferred embodiment of the present invention.

FIG. 3 illustrates another preferred embodiment. A radiation source 100, such as a reflector assembly, focuses radiation flux into reactor 110. The energy absorbing fluid, i.e. reactant, is controllably released from storage and supply vessel 120 and introduced into rector 110. The absorption fluid preferably is chlorine or an interhalogen. The absorbing fluid undergoes a reversible reaction in the reactor 110, with the equilibrium favoring the reaction product. The reaction products are exhausted, to a heat exchanger 130. A conversion fluid is also introduced into the heat exchanger 130 from conversion fluid reservoir 140. The heat contained by the reaction products is transferred within the heat exchanger 130 to the conversion fluid. The cooled reaction products re-associate to the starting materials. In the case of halogens and interhalogens, the reassociation may take place within the reactor itself. The reaction products, i.e., starting materials, which leave the heat exchanger 130 may be subjected to further heat exchange treatments prior to being returned to storage and supply vessel 120. The heated conversion fluid leaves the heat exchanger 130 and is introduced into an energy converter, such as turbine 150, where the heat energy of the conversion fluid is converted to useful work. The conversion fluid is exhausted from the energy converter and passed through a heat sink 160. That sink 160 may, for instance, be of the spiral fin type with a counter current flow of another fluid or, more advantageously, a radiating type of heat exchanger. In addition, an ammonia cycle 165 may be included to further extract heat energy from the system in the cooling stage.

The ammonia cycle may be used in combination with others known in air conditioning apparatus.

In this embodiment, the conversion fluid is, most advantageously, for example, monochlorobenzene. In principle it is also possible to use certain chloro-fluorocarbons and water.

The chief advantage of the two-stage embodiment is that the energy-absorbing subsystem can be selected for advantageous radiation absorbing and transferring characteristics, and the working substance in the energy converted subsystem may be selected for use for example, for driving a turbine.

Figure 4:
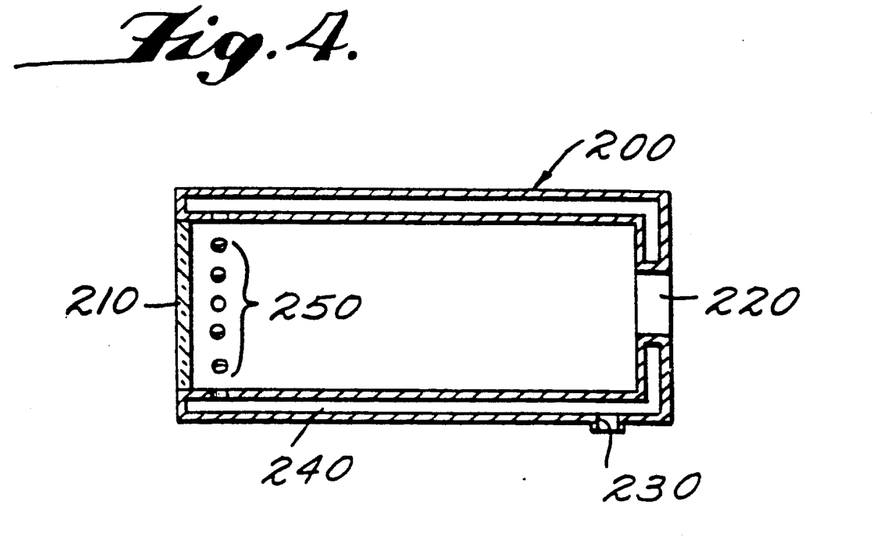
FIG. 4 illustrates an embodiment of the reaction chamber used in the preferred embodiments of the present invention.

FIG. 4 shows a reactor 200 having a window 210, an exhaust port 220, and means for pre-circulating and pre-heating reactants. The means for pre-circulating and pre-heating reactants comprises an inlet for reactants 230, passageway(s) 240 in the reactor wall through which reactants may circulate, and means for introducing reactants into the chamber (defined by the interior walls) 250. Means 250 may comprise a manifold system having a plurality of openings.

Figure 5:
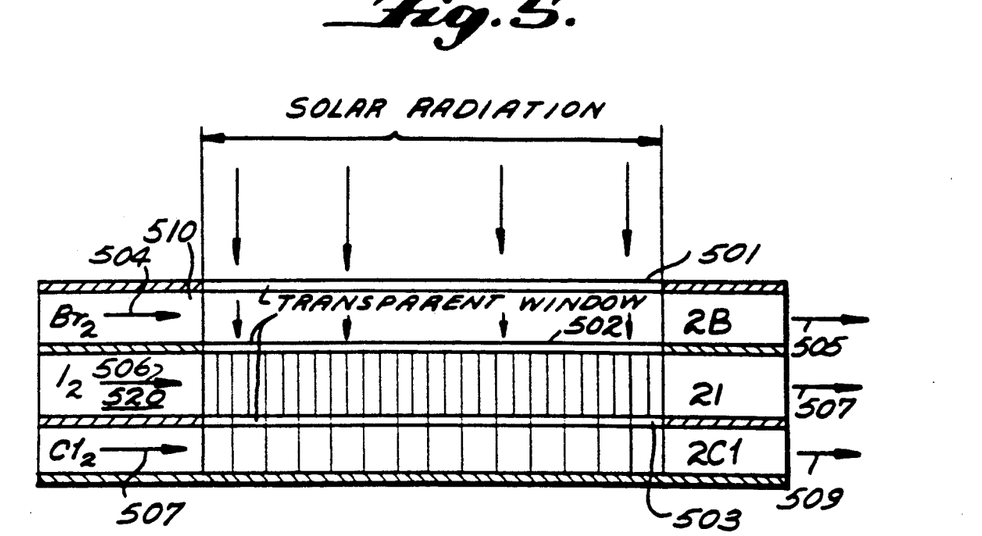
FIG. 5 illustrates a preferred embodiment of the reaction chamber of the present invention.

With reference now to FIG. 5, a preferred embodiment of the reactor according to the present invention comprises a plurality of contiguous chambers. In FIG. 5, light enters chamber 510 through transparent window 501. Supply means (not shown) supply $Br_2$ into the chamber in the direction of arrow 504. Discharge means (not shown) discharge the monatomic reaction products in the direction of arrow 505. Light which is not absorbed by the bromine in chamber 510 passes through transparent wall 502 into chamber 520. Chamber 520 has means (not shown) for supplying $I_2$ into the chamber in the direction of arrow 506. Means are also provided (not shown) for discharging monatomic iodine reaction products in the direction of arrow 507.

Light which is not absorbed by the $I_2$ in chamber 520 passes into chamber 530 by means of transparent window 503. $Cl_2$ is supplied into chamber 530 in the direction of arrow 508 and monatomic reaction products are discharged in the direction of arrow 509.

The embodiment of FIG. 5 can, of course, be modified to comprise two, three of more chambers capable of containing any desired halogen, interhalogen, or mixtures thereof. The absorption of the reactor may be tailored to suit the particular radiation available.

Table 1 illustrates the potential absorption efficiencies for the dissociation reactions of various halogens and interhalogens. The wavelength of maximum absorption for these reactions varies species varies from 330 nm for $Cl_2$ to 500 nm for IBr. It is therefore possible to cover a significant portion of the solar spectrum, for example by judicious selection of species in the reactor.

TABLE 1

| | POTENTIAL SOLAR ABSORPTION EFFICIENCY | | | |
|---|---|---|---|---|
| REACTION | max$^{(nm)}$ | max/ (kcal/mol) | range$^{(nm)}$ | POTENTIAL SOLAR ABSORPTION EFFICIENCY (% of 1353 W/m$^2$) |
| $Cl_2 \rightarrow Cl(^2P_{3/2})$ | 330 | 86.640 | 250–450 | 14 |
| $Br_2 \rightarrow Br(^2P_{3/2}) + Br(^2P_{3/2,1/2})$ | 446.2 | 61.328 | 300–510 (600)* | 6 |
| $I_2 \rightarrow I(^2P_{3/2}) + I(^2P_{3/2})$ | 499.5 | 57.239 | 400–500 (650)* | 21 |
| $IBr \rightarrow I(^2P_{3/2}) + Br(^2P_{1/2,3/2})$ | 500 | 57.182 | 220–600 | 32 |
| $IC \rightarrow I(^2P_{3/2}) + C(^2P_{3/2,1/2})$ | 470 | 60.832 | 220–570 | 29 |
| $BrC \rightarrow Br(^2P_{3/2}) + C(^2P_{3/2,1/2})$ | 370 | 77.273 | 220–510 | 22 |

*$Br_2$ and $I_2$ photodissociation for 510 to 600 nm and for 500 to 540 nm, respectively, proceeds at a quantum yield of about 0.5.

Figure 6:
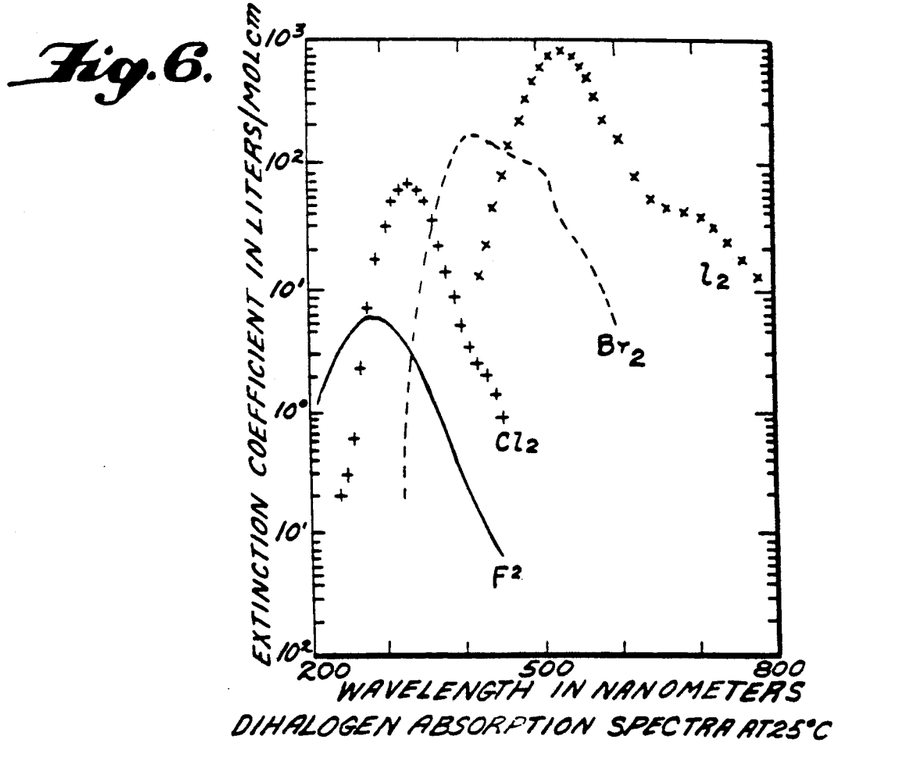
FIG. 6 shows dihalogen absorption spectra at 25° C.
Figure 7:
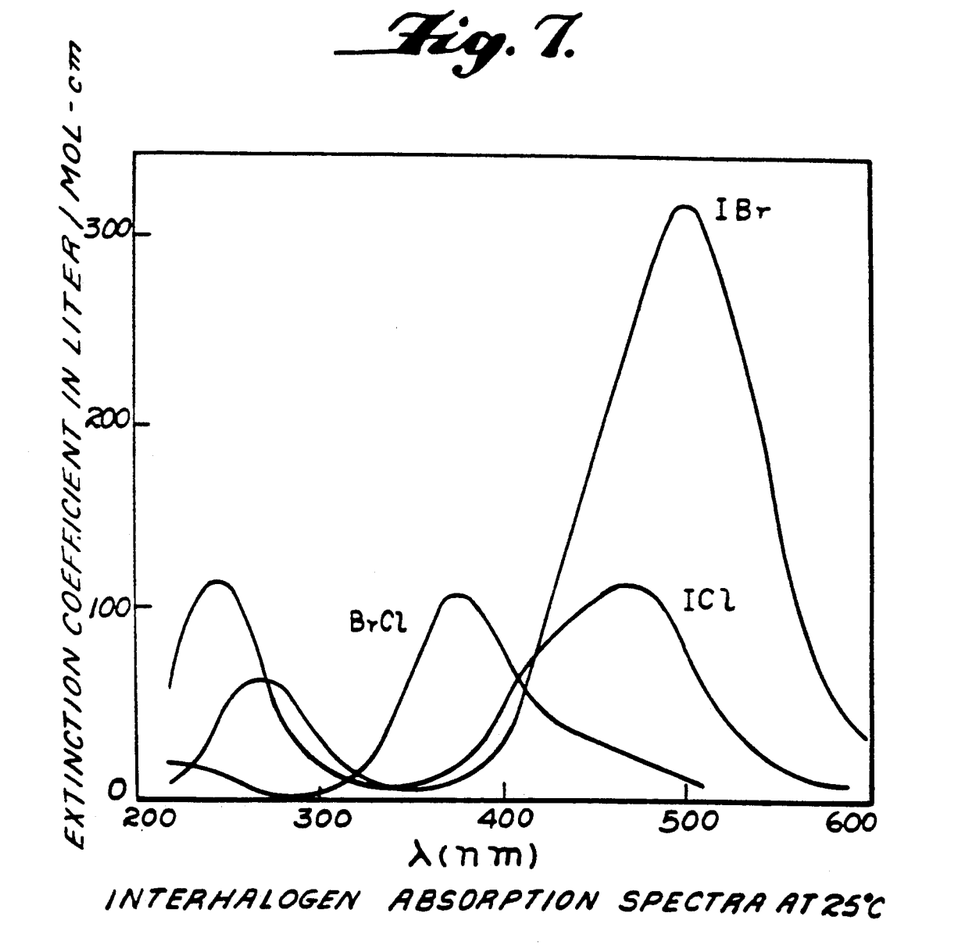
FIG. 7 shows interhalogen absorption spectra at 25° C.
Figure 8:
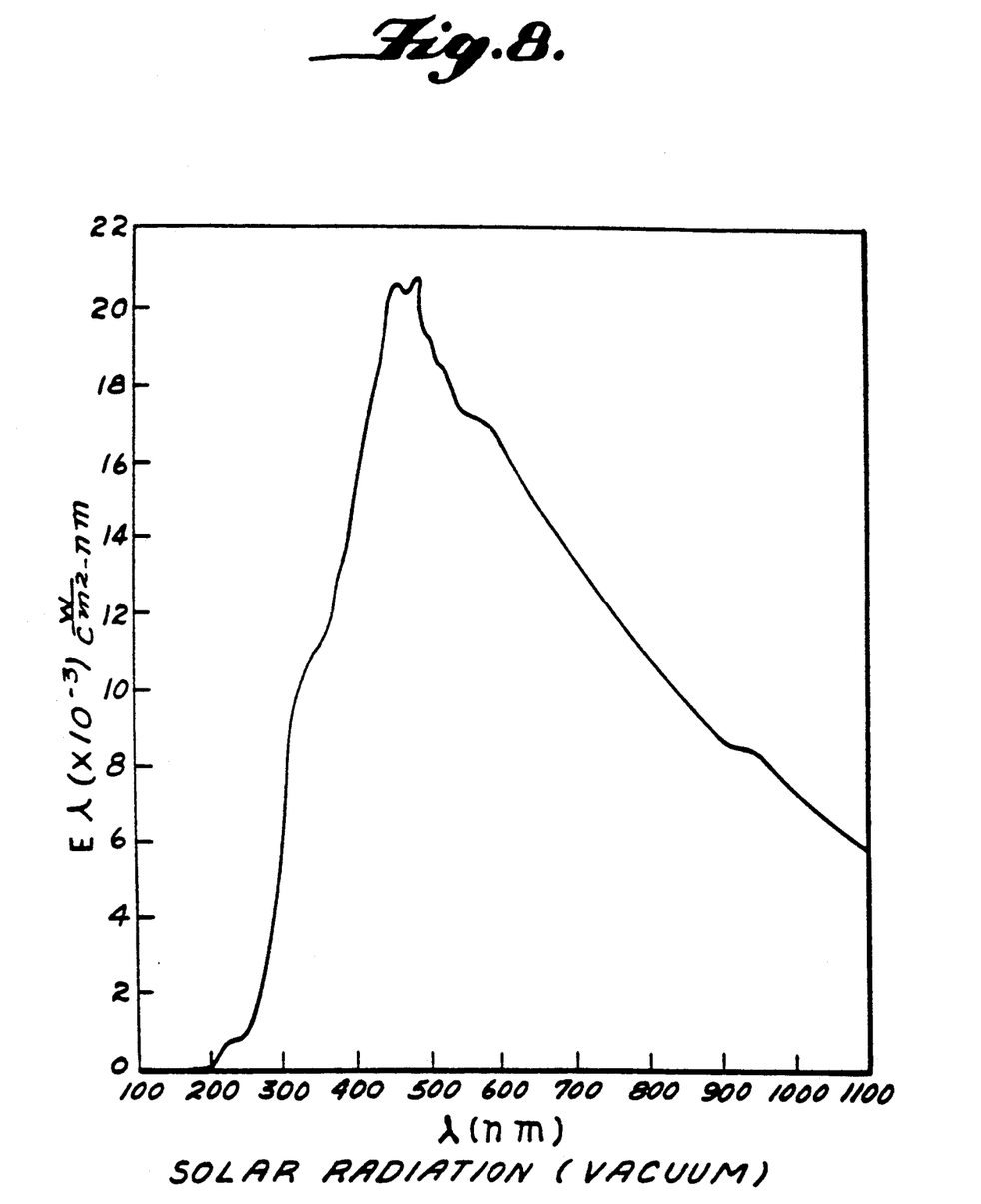
FIG. 8 shows the solar radiation spectrum in a vacuum.

FIG. 6 and 7 are graphic representations of the absorption spectra of dihalogens and interhalogens respectively. The solar spectrum is shown in FIG. 8. It can be readily seen by comparing FIG. 8 with FIGS. 6 and 7 that several halogen and interhalogen species have absorption maxima at or near the maxima of solar radiation.

Although the present invention is described in terms of preferred embodiments, one of ordinary skill in the art will recognize that departures may be made while remaining within the scope of the present invention.

We claim:

1. An augmented power system for converting radiation energy to other forms of power comprising radiation means (10, 100) for focusing a radiation flux into a beam of radiation, reactor means for receiving the beam of radiation, conversion means for converting the beam of radiation to another energy form, characterized in that, the power system comprises supply vessel means (25, 70, 120) for releasably storing diatomic reactants, said diatomic reactants being selected from the group consisting of halogens, interhalogens, and mixtures thereof, a reactor (20, 60, 110) defining a closed volume, said reactor having means for receiving said beam of radiation and transmitting said beam into the said closed volume defined by the reactor, means for receiving and charging said reactor with diatomic reactants supplied from said supply vessel means, whereby the radiation flux focused into the reactor induces the reactants to react to disassociate in the reactor to form high energy reaction products at elevated temperatures and pressures, said reactor further having means for discharging the reaction products from said reactor, an energy converter (30, 80, 150) for converting the energy contained in the thus formed and discharged reaction products into another energy form, means for exchanging residual heat (40, 90, 130) from the reaction products to regenerate low energy reactants, said exchanging means further comprising means for recycling the reactants to said supply vessel means, and wherein said closed volume defined by the reactor comprises a plurality of chambers having transparent walls, arranged contiguously so that light passing through one of said chambers and not absorbed by the reactants in that chamber could pass into subsequent chambers, wherein each of said chambers has independent supply vessel means and means for discharging reactants.

2. A power system according to claim 1, wherein said plurality of chambers comprises three chambers (510, 520, 530) arranged contiguously so that light passing through a first chamber (510) and not being absorbed by the reactants therein passes into a second chamber (520) through a transparent wall (502) separating the first and second chambers, and light passing through the second chamber (520) and not being absorbed by the reactants in the second chamber passes into a third chamber (530) through a transparent wall (503) separating the second and third chambers.

3. A power system according to claim 2, further comprising a first supply means for supplying $Br_2$ to the first chamber, a second supply means for supplying $I_2$ to the second chamber, and a third supply means for supplying $Cl_2$ to the third chamber.

4. Process for augmenting a power system by converting radiation energy to other forms of power comprising collecting and focusing a radiation flux into a beam of radiation, receiving the beam of radiation, converging the energy of the radiation beam to another energy form, characterized in that, the process comprises the steps of controllably supplying diatomic reactants, selected from the group consisting of halogens, interhalogens and mixtures thereof, into a reaction chamber, directing said beam of radiation into the reaction chamber (20, 60, 110) to receive the radiation by means of reactants which disassociate, thereby generating high-energy reaction products at elevated temperature and pressure, controllably releasing the high-energy reaction products from said reaction chamber, converting the energy contained in the thus withdrawn reaction products to another energy form, extracting residual heat form the reaction products, and regenerating the reactants, and further comprising the step of supplying a nonreactive working fluid into said reactor along with said reactants.

5. Process for augmenting a power system by converting radiation energy to other forms of power comprising collecting and focusing a radiation flux into a beam of radiation, receiving the beam of radiation, converting the energy of the radiation beam to another energy form, characterized in that, the process comprises the steps of controllably supplying diatomic reactants selected from the group consisting of halogens, interhalogens and mixtures thereof into a reaction chamber, directing said beam of radiation into a reaction chamber (20, 60, 110) to receive the radiation by means of reactants which disassociate, thereby generating high-energy reaction products at elevated temperature and pressure, exhausting said reaction products from said reaction chamber and passing said reaction product through a heat exchanger, introducing a conversion fluid into the heat exchanger whereby the heat contained by said reaction products is absorbed by said conversion fluid, exhausting the thus heated conversion fluid and passing said conversion fluid through an energy converter, further cooling said conversion fluid and recycling said fluid through said heat exchanger, recycling the reaction products to regenerate said reactants, and re-supplying the reactants to said reaction chamber, and further comprising the step of supplying a nonreactive working fluid into said reactor along with said reactants.

6. A process according to claim 4 or 5, wherein the nonreactive working fluid is selected from inert gases.

* * * * *